United States Patent Office 3,532,791
Patented Oct. 6, 1970

3,532,791
N,N'-ETHYLENEBIS(2-(o-HYDROXY-PHENYL)GLYCINE)
Charles Johnston, Midland, Mich., assignor to The Dow Chemical Company, Midland, Mich., a corporation of Delaware
No Drawing. Filed Oct. 3, 1966, Ser. No. 583,941
Int. Cl. A61k 21/00, 27/00
U.S. Cl. 424—227          29 Claims

ABSTRACT OF THE DISCLOSURE

A tetracyline antibiotic useful for oral administration to warm blooded animals is potentiated by administering therewith from about 3 to about 6 times by weight, antibiotic basis, of a compound corresponding to the formula:

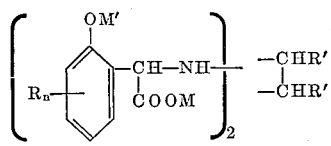

wherein M represents hydrogen, sodium, potassium or ammonium; and, M being hydrogen, M' represents hydrogen, or, M being sodium, potassium or ammonium, M' represents hydrogen or the same moiety represented by M; R in each of its $n$ occurrences independently represents halo, hydroxy, loweralkyl, or loweralkoxy; $n$ represents an integer of from 0 to 2, inclusive; and each R', taken separately, independently represents hydrogen or methyl, or, both R' moieties, taken together, represent a 1,4-butylene radical.

---

The present invention is concerned with the potentiation of tetracycline antibiotics.

The tetracycline antibiotics are a known group of biologically active octahydronaphthacene derivatives having the following essential structural features:

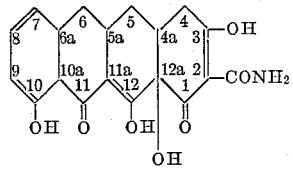

The number system indicated is that employed by Chemical Abstracts. A tautomeric relationship exists between the substituents at the 11, 11a, and 12 positions:

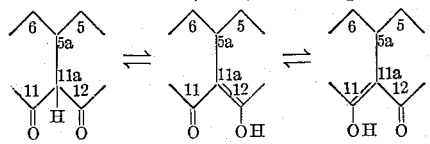

All of the tetracyline antibiotics comprise the structural unit thus described. In addition, each of the tetracycline antibiotics bears one or more yet other substituents. Commonly employed tetracyline antibiotics, and their respective substituents, are listed in the following table:

While this table identifies the commonly employed tetracycline antibiotics, there are numerous other tetracycline antibiotics which contain the essential structural formula set forth above but which also bear other substituents in addition to, or in place of one or more of, the substituents identified in the table. Representative such other tetracycline antibiotics include those taught in U.S. Pats. 2,984,686; 3,239,499; 3,239,501; 3,247,250; 3,250,809; 3,250,810; and 3,265,732.

The various tetracycline antibiotics can be employed directly or can be employed in the form of derivatives thereof, notably salts. Such salts include the calcium chloride and other similar complexes; inorganic acid addition salts such as sulfates, hydrohalides, and the like; the sodium, potassium, magnesium and calcium salts; and organic quaternary ammonium salts. Many of these salts are preferred because their use facilitates absorption by the animal body of the active moiety. For this reason, the monochloride salts are employed much more widely than the corresponding free base materials.

Thus, in the present specification and claims, the term "tetracycline antibiotic" is employed to described a compound or derivative thereof which comprises the essential structural unit described foregoing and which exhibits to a greater or lesser degree that activity known to be exhibited by tetracycline itself. However, the identity of the particular tetracycline antibiotic employed is not critical in the practice of the present invention.

There are numerous areas of application of the tetracycline antibiotics in the treatment of warm-blooded animals. Administration of the antibiotics is sometimes carried out to effect a cure of a specific disease, and in this instance, the administration may be of short duration. In other situations, the administration is carried out on a more or less continuous basis, usually at lower levels, than those employed in short term administration, to serve as a prophylactic and/or growth stimulant. The antibiotics can be administered orally or by injection, but the former route is preferred, especially in the treatment of large numbers of domestic animals.

The most notable application of the tetracycline antibiotics in the treatment of domestic animals is in raising fowl. While the tetracycline antibiotics as well as numerous other antibiotics are sometimes incorporated in poultry feeds at low levels to serve as a prophylactic, the more important application of the tetracycline antibiotics is in the intermittent feeding of the antibiotics to control outbreaks of any of numerous diseases, including fowl cholera, fowl typhoid, blue comb, cecal and intestinal coccidiosis, and especially chronic respiratory disease (referred to as sinusitis in turkeys). The most readily apparent symptoms of this last disease are a persistent respiratory noise, typically described as a "snick," poor feed conversion, and lowered egg production. The disease is highly infectious and in the absence of treatment is often fatal to a large portion of any infected flock.

The effectiveness of the tetracycline antibiotics in most of their numerous therapeutic and/or prophylactic applications is largely dependent upon the degree to which they are absorbed into the blood system and therefore made

| Substituents | Common name |
|---|---|
| 4-N(CH₃)₂, 6-OH, 6-CH₃ | Tetracycline. |
| 4-N(CH₃)₂, 5-OH, 6-OH, 6-CH₃ | 5-oxytetracycline, or simply oxytetracycline. |
| 4-N(CH₃)₂, 6-OH, 6-CH₃, 7-Cl | 7-chlortetracycline, or simply chlortetracycline. |
| 4-N(CH₃)₂, 6-OH | 6-demethyltetracycline. |
| 4-N(CH₃)₂, 6-OH, 7-Br | 6-demethyl-7-bromtetracycline. |
| 4-N(CH₃)₂, 5-OH, 6-CH₃ | 6-deoxy-5-oxytetracycline. |
| 5-OH, 6-CH₃, 6-OH | 4-desdimethylamino-5-oxytetracycline. |
| 4-N(CH₃)₂, 6-CH₃ | 6-deoxytetracycline. |
| 4-N(CH₃)₂ | 6-deoxy-6-demethyltetracycline. |
| 4-N(CH₃)₂, 6-OH, 6-CH₃, 7-Br | 7-bromtetracycline, or simply bromtetracycline. |
| 4-N(CH₃)₂, 6-OH, 7-Cl | 6-demethyl-7-chlortetracycline. |
| 6-OH, 6-CH₃ | 4-desdimethylaminotetracycline. |
| 6-OH, 6-CH₃, 7-Cl | 4-desdimethylamino-7-chlortetracycline. |
| 4-N(CH₃)₂, 5-OH, 6- =CH₂ | 6-deoxy-6-demethyl-6-methylene-5-oxytetracycline. | available throughout the body of the animal. However, it has long been known that the tetracycline antibiotics have an affinity for metals present in the digestive system, the most prevalent being calcium. This affinity is exhibited even at low concentrations of metal, such as those normally found in the digestive tracts of warm-blooded animals. Accordingly, a substantial portion of the antibiotic is bound up in the digestive system, and its uptake is severely inhibited. As a result, even relatively large oral doses of the tetracycline antibiotics often fail to achieve a high enough level of antibiotic in the blood to obtain the desired therapeutic and/or prophylactic effects.

In view of this binding of the tetracycline antibiotics, the therapeutic and/or prophylactic efficacy of such antibiotics in most applications can be correlated accurately only with their presence in the blood system. Procedures have been developed to ascertain even very low blood levels of the tetracycline materials, and the antibiotic blood level is now taken as an accurate measure of efficacy. These procedures measure the amount of antibiotic at concentrations as low as 0.05 microgram per milliliter, in the instance of chlortetracycline and its salts, and at concentrations as low as 0.15 microgram per milliliter, in the instance of tetracycline and oxytetracycline and their salts.

Extensive attempts have been made to overcome the difficulty associated with oral administration of the tetracycline antibiotics. Most notably, the calcium content of feeds has been diminished as low as is consistent with feed manufacturing practices. When the antibiotics are incorporated in such low-calcium feeds, the absorption of the antibiotics into the blood system proceeds, in the absence of the interfering calcium, at a more reasonable rate. However, this practice suffers the disadvantage that it deprives the animal being treated of calcium vital to its growth. Hence, this method of treatment cannot be continued indefinitely. Yet if this treatment is to be effective, it must be continued for a long enough period of time that the antibiotic level in the blood reaches a sufficiently high, that is, therapeutic and/or prophylactic, level, and is maintained thereat for a sufficient period of time. Thus in practice, some growth depression often results from this type of treatment; or, if treatment is carried out for an insufficient period of time, the desired effects of antibiotic administration are incompletely achieved. And at best, even with such low-calcium feeds, a portion of the antibiotic, typically an expensive substance, is not utilized by the animal.

Also, certain well-known chelating agents, most notably ethylenediaminetetraacetic acid or its sodium salt, have been evaluated in feeds containing the antibiotics. However, it has been found that the use of ethylenediaminetetraacetic acid or its sodium salt is unacceptable since, while enhancing antibiotic absorption, it does so only at rates high enough that, according to one publication, marked growth depression results. The same publication notes that other chelating agents evaluated have been found to have the same disadvantage. In addition, the administration to animals of potentiating amounts of the ethylenediaminetetraacetic acid, particularly in its more convenient sodium salt form, is generally accompanied by the occurrence of diarrhea in the animals.

In addition, terephthalic acid was discovered to increase the concentration of the tetracycline type antibiotics in the blood, even in feeds containing the normal component of calcium. The mechanism by which terephthalic acid operates is unknown, but it appears that it operates by a mechanism other than calcium binding, possibly depression of renal secretion of the antibiotic. However, upon further evaluation, it was found that this use of the compound presented serious difficulties, and approval by the Federal Food and Drug Administration was not granted.

In another attempt to surmount the difficulty associated with oral administration, experiments were carried out to evaluate the effect of varying the calcium source. It was discovered that various calcium salts, even at normal calcium levels, exhibited different degrees of interference with the uptake of the tetracycline antibiotics. However, the differences in interference were found to be slight, and, moreover, those salts exhibiting less interference were deemed to be too expensive to warrant usage.

Therefore, up to the present time, no method that is economically feasible and represents sound practice, has been found whereby, upon oral administration, the blood levels of the tetracycline antibiotics can be, even temporarily, raised to be high enough to reliably effect the desired therapeutic benefits without concomitant growth depression and/or other undesirable side effects.

In the absence of a satisfactory method, general practice at the present time in poultry raising consists of the intermittent use of (1) a regular feed having normal calcium content and no antibiotic and (2) a low-calcium feed containing the tetracycline antibiotic at levels of 50 grams and more per ton of feed. This practice suffers disadvantages, including those previously discussed.

Moreover, the use of the antibiotics in higher concentrations raises a considerable risk that, while the antibiotics, at lower concentrations, disappear from animal tissues within a reasonable period of time, residue-tolerance levels in slaughtered animals will be exceeded at the higher concentrations. To assure appropriate disappearance of the antibiotics from tissues, the maximum allowable level of the tetracycline antibiotics in animal feeds has been set by the Federal Food and Drub Administration at 200 grams, in some instances, 100 grams, per ton. (Title 21, Code of Federal Regulations (U.S. Government Printing Office), Sections 121.208 and 121.251; or see the Food Drug Cosmetic Law Reporter (published by Commerce Clearing House, Inc., New York, N.Y.), Part 121, Subpart C, 21 CFR, Sections 121.208 and 121.251). Widespread informal reports lead to the view that, especially in the poultry industry, violations of these levels are commonplace.

An alternate method of treatment at the present time consists of the continuous use of a feed containing the antibiotic and a modest concentration of a selected calcium source which by nature exhibits less interference with antibiotic uptake. However, this manner of treatment is similarly wasteful of antibiotic and similarly tempts to exceed approved feed levels; in addition, it is generally even less effective in achieving the disease control sought.

The inadequacy of these methods is indicated by the fact that in spite of treatment by either, flocks of poultry being slaughthered for market are found to contain as high as 30 percent of birds showing signs of the diseases which would have been controlled by higher blood levels of the tetracycline antibiotics. These diseased birds are considered unfit for human consumption and are discarded, causing the poultry producer a severe economic loss. A more effective method of administration is needed.

There has now been discovered a greatly improved method and composition for the oral administration of a tetracycline antibiotic. This method comprises, most broadly, administering orally to a warm blooded animal an effective amount of a tetracycline antibiotic and a potentiating agent in an amount sufficient to potentiate the tetracycline antibiotic. In the present specification and claims, the term "potentiate" and other forms of the same word are employed to refer to an enhancement of the therapeutic efficacy of an amount of a tetracycline antibiotic orally administered.

The potentiating agent to be employed in accordance with the present invention is a compound of the formula:

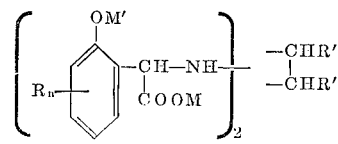

In the above and succeeding formulae in the present specification and claims, M represents hydrogen, alkali metal, or ammonium; and, M being hydrogen, M' represents hydrogen, or, M being alkali metal or ammonium, M' represents hydrogen or the same moiety represented by M; R in each of its $n$ occurrences independently represents halo, hydroxy, loweralkyl, or loweralkoxy; $n$ represents an integer of from 0 to 2, both inclusive; and each R', taken separately, independently represents hydrogen or methyl, or both R' moieties taken together represent a 1,4-butylene radical.

Products in accordance with the foregoing definition are conveniently employed in the form of the hydrohalide addition salt. The salt can be either a monohydrohalide or a dihydrohalide salt. In the present specification and claims, the terms "loweralkyl" and "loweralkoxy" are employed to designate alkyl and alkoxy, radicals, respectively, wherein the alkyl portion is an alkyl being of from 1 to 4, both inclusive, carbon atoms; the term "alkali metal" is employed to designate sodium and potassium, only; and the terms "halide" and "halo" are employed to designate appearances of bromine, chlorine, and iodine, only.

The products meeting the above compound definition of potentiating agent are prepared in accordance with known methods. In general, either of two synthesis methods is employed in preparing the products. In one synthesis route, two moles of salicylaldehyde of the formula:

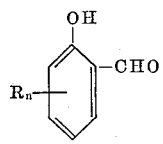

are reacted with one mole of a diamine of the formula:

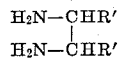

to obtain the resulting Schiff base. The Schiff base is then reacted with two moles of hydrogen cyanide, yielding the corresponding dinitrile, which, upon reaction with concentrated hydrochloric acid, results in the desired product wherein M and M' represent hydrogen. Further details of this reaction are set forth in British Pat. 782,928.

In another synthetic route, two moles of a phenol starting material of the formula:

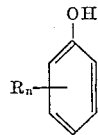

and whereof at least one ring position ortho to the hydroxy group is unsubstituted are reacted with two moles of sodium glyoxylate and one mole of a diamine, as previously defined in the discussion of the foregoing synthetic route. The reaction also results in the desired products wherein M and M' represent hydrogen. Sodium dichloroacetate can be employed instead of sodium glyoxylate if additional base is supplied. Further details of this reaction are set forth in U.S. Pat. No. 2,824,128.

Those products to be employed in accordance with the present invention wherein M represents alkali metal or ammonium or both of M and M' represent alkali metal or ammonium are prepared in conventional procedures. In these procedures, the corresponding product wherein M and M' represent hydrogen is reacted with an alkali metal or ammonium hydroxide. Reaction occurs first at the site of the —COOH group, thereafter at the site of the —OH group. Thus, when it is desired to prepare product wherein M represents alkali metal or ammonium and M' represents hydrogen, two moles of the hydroxide reactant are employed per mole of the starting substance wherein both M and M' represent hydrogen. Similarly, when it is desired to obtain a product wherein both M and M' represent alkali metal or ammonium, four moles of the hydroxide are employed per mole of the starting substance wherein both M and M' represent hydrogen. The hydrohalide salts are also prepared in known procedures. In these procedures, an aqueous solution of the hydrohalic acid is reacted with an aqueous slurry of the product to be employed in accordance with the present invention wherein M and M' represent hydrogen. Good results are obtained at room temperatures with stoichiometric proportions of the reactants. Separation of the hydrohalide salt is achieved by evaporation of water.

The materials to be used as potentiating agent in accordance with the present invention are crystalline solid materials. A sample of N,N'-ethylenebis(2-(o-hydroxyphenyl)glycine) described as being of 90 percent purity melted with decomposition at 234–5° C., whereas another sample described as being of 95 percent purity melted with decomposition at 235–7° C. A sample of dihydrochloride salt of N,N'-ethylenebis(2 - o-hydroxyphenyl)glycine) described as being of 90–5 percent purity melted with decomposition at 230–231° C. It is not critical to the practice of the present invention that the active salt be of high purity; in some instances, it may be economically preferred practice to use a larger gross amount of a less pure substance, to achieve desired activity, than to purify the substance. This practice is particularly applicable where the impurities present are inert or even, as is sometimes the case, beneficial in the nutrition of animals.

Representative products to be employed in accordance with the present invention include:

N,N'-ethylenebis(2-(2-hydroxy-5-chlorophenyl) glycine);
N,N'-propylenebis(2-(2,4-dihydroxyphenyl) glycine)dihydriodide;
N,N'-ethylenebis(2-(2-hydroxy-6-bromophenyl) glycine);
N,N'-1,2-cyclohexylenebis(2-(2-hydroxy-5-methoxyphenyl)glycine);
N,N'-ethylenebis(2-(2-hydroxy-3-butoxyphenyl) glycine)dihydrochloride;
N,N'-ethylenebis(2-(2-hydroxy-5-methylphenyl) glycine);
N,N'-1,2-butylenebis(2-(2-hydroxy-4,5-diethoxyphenyl)glycine);
N,N'-ethylenebis(2-(2-hydroxy-5-tert-butylphenyl) glycine);
N,N'-propylenebis(2-(2-hydroxy-3,5-dimethylphenyl) glycine)dihydrobromide;
N,N'-1,2-butylenebis(2-(2-hydroxy-3-bromo-5-tert-butylphenyl)glycine);
N,N'-1,2-cyclohexylenebis(2-(2-hydroxy-5-iodophenyl)glycine);
N,N'-ethylenebis(2-(2-hydroxy-3-isopropylphenyl) glycine);
N,N'-ethylenebis(2-(2-hydroxy-5-methoxyphenyl) glycine), tetrasodium salt;
N,N'-ethylenebis(2-(2-hydroxy-5-methylphenyl) glycine), dipotassium salt;
N,N'-ethylenebis(2-(2-hydroxy-5-chlorophenyl) glycine), tetraammonium salt;
N,N'-1,2-cyclohexylenebis(2-(2-hydroxy-3-bromo-5-chlorophenyl)glycine), disodium salt;
N,N'-propylenebis (2-(2-hydroxy-5-iodophenyl) glycine), diammonium salt;
N,N'-propylenebis(2-(o-hydroxyphenyl) glycine), disodium salt; and
N,N'-ethylenebis(2-(o-hydroxyphenyl) glycine), diammonium salt.

The present invention differs from the prior art in that, employing the methods and compositions of the present invention, it is possible conveniently and economically to establish higher ratios of concentration of tetracycline antibiotics in blood to concentration of tetracycline antibiotic in feed than have hitherto been possible. Thus, within the present invention, it is possible to achieve tetracycline antibiotic concentrations in blood high enough to be completely satisfactory while employing tetracycline antibiotic concentrations in feed within established tolerance limits. In the foregoing statement, "blood" means the blood of an animal being medicated by means of antibiotic-containing feed according to the prior art or the present invention. The new method provides excellent control and prevention of the infections against which the tetracycline antibiotics are effective. In addition, the time period needed for treatment with a tetracycline antibiotic is frequently substantially reduced. Contrary to the prior art, the use of the present potentiating agents in a potentiating amount is not accompanied by growth depression. Moreover, the present invention provides economic benefits in the reduced amount of antibiotic necessary, as well as in reduced loss of animals due to inadequate disease control by the antibiotics.

The mechanism by which the present invention operates has not been established. It is known that the potentiating agent to be employed in accordance with the present invention has the chemical properties of a chelating agent for some metals; however, as noted above, the chelating agents evaluated to date, notably ethylene-diaminetetraacetic acid, have been found to be unacceptable in antibiotic potentiation. It is tentatively believed that the mechanism of the present potentiating agent is one of chelation. However, the possibility of a mechanism in which the excretion of antibiotic is retarded, or of yet other possible mechanisms, has not been excluded.

The oral administration, essentially simultaneously, of an at least prophylactic amount of a tetracycline antibiotic and a potentiating amount of the present potentiating agent is essential and critical to the practice of the present invention. However, the exact dosages supplied are not critical and will vary considerably depending upon a wide variety of factors, such as the animal concerned, the age of the animal, whether the antibiotic is to be employed for disease control (usually at higher rates) or for prophylactic purposes and/or growth stimulation (usually at lower rates), the particular antibiotic employed, and the like. The dosage of antibiotic, when employed in accordance with the present invention, can be of the same magnitude as the dosages in the prior art, such as the dosages admissable under Federal regulations. However, in view of the potentiation effected in accordance with the present invention, the same antibiotic effect is generally achieved with lower dosages. Typically, an antibiotic dosage of from 1 to 8 milligrams of antibiotic per kilogram of animal body weight is effective in the practice of the present invention. Higher amounts can be employed but seldom offer any advantage. Where administration is on a daily basis and disease is light, rates of from about 2 to 4 milligrams of antibiotic per kilogram of animal body weight are usually effective. Even lower rates, such as rates of from 0.05 to 1 milligram of antibiotic per kilogram of animal body weight are frequently employed with good results where disease is not prevalent and the main objective is a prophylactic treatment and/or growth stimulation.

Similarly, the dosage of the potentiating agent is not critical and can vary over a considerable range. Generally, potentiation is observed when the potentiating agent is employed at a dosage of from about 12 to 30 milligrams of agent per kilogram of animal body weight. Hence, potentiation is generally achieved when the potentiating agent is employed in an amount of from 3 to 6 times the amount of antibiotic employed. Lower rates of potentiating agent are sometimes adequate to effect the potentiation of the antibiotic. Higher rates, on the other hand, are unnecessary, and are seldom preferred. Moreover, their use is economically unjustifiable.

It is not critical that the antibiotic and the potentiating agent be administered in intimate mixture with one another, although it is necessary that the administration of both substances be carried out essentially simultaneously. By "essentially simultaneously" is meant a time relationship such that the administration results in the simultaneous presence in substantially the same region of the digestive system of an animal thus medicated, of the tetracycline antibiotic and the potentiating agent. Also, one of the substances can be administered in one feed and the other substance in another feed, often a supplemental food source such as a salt lick, or the like. However, due to the variation of intake which is possible with this type of treatment, it is seldom preferred. Generally, therefore, it is preferred that both substances be administered together, that is, by the administration of a composition comprising both an effective amount of the antibiotic and a potentiating amount of the potentiating agent. In this manner of treatment, the amounts administered and the ratio of one to the other are more readily controlled.

When the method of the present invention is carried out by the administration of a composition comprising both substances, the exact nature of the composition is not critical. For example, the composition can be a liquid or a finely divided solid. In some instances, it may be adequate to administer the two substances in the form of a tablet, capsule, or other similar form. However, administration by this route constitutes an additional step which, especially in the raising of large groups of domestic animals, is undesirable. For this reason, and also because the antibiotic is more effective if administered regularly portionwise over a period of time, the method of the present invention is preferably carried out in conjunction with the regular supplying to the animals of necessary substances—notably, food, water, and such supplemental compositions as are fed to a given animal. Of these routes, administration in feed is generally the most preferred route.

Regardless of whether the antibiotic and potentiating agent are administered separately or together, the method of the present invention can be carried out by administration of unmodified antibiotic and unmodified potentiating agent. However, the present invention can also be implemented with a composition comprising antibiotic and another composition comprising potentiating agent, or with a composition comprising both antibiotic and potentiating agent. Such compositions, in addition to the antibiotic and/or potentiating agent, can contain one or more of a plurality of edible adjuvants. Representative edible adjuvants include liquid feeds and/or carriers, such as water, ethanol, skim milk, edible oils, propylene glycol, and syrups; solid feeds and/or carriers, such as grain rations and the like; liquid or solid surface active dispersing agents; and feed additives, such as minerals, vitamins, antioxidants, coccidiostats, anthelmintic materials, growth stimulants, and other antibiotic materials, such as members of the penicillin group, sulfa group, streptomycin group, neomycin group, and of yet other groups of antibiotic materials. The precise identity of components is not critical but will vary depending upon the animal concerned, its age, whether the composition is to serve as an essentially complete animal feed or as a feed concentrate, and upon yet other factors. Similarly, the exact concentration of tetracycline antibiotic and potentiating agent is not critical and can vary provided only that enough of the composition (or compositions, where the tetracycline antibiotic is present in one composition and the potentiating agent is present in another composition) is ingested to provide the required internal amount of antibiotic and potentiating agent.

In one embodiment, there is employed an animal feed concentrate comprising from 0.5 to 99.5 percent of a tetracycline antibiotic and from 99.5 to 0.5 percent of the present potentiating agent, both percentages being expressed as percentages by weight of total composition, and any other ingredients being normal animal feed concentrate ingredients. Thus, such animal feed concentrate can comprise only the tetracycline antibiotic and the potentiating agent, or it can comprise the tetracycline antibiotic and potentiating agent, and, in addition, one or more edible adjuvants, such as the representative edible adjuvants set forth foregoing. Such a composition is adapted to be administered directly to an animal—particularly where it is administered in conjunction with another feed which completes the dietary requirements of the animal; or such a composition can serve as a concentrate and be further mixed with other adjuvants of the type set forth above to obtain an essentially complete animal feed. While the exact concentration of antibiotic and potentiating agent in the animal feed concentrate is not critical, a preferred concentration range is from 2 to 20 percent of the tetracycline antibiotic and from 98 to 80 percent of the potentiating agent, both percentages being expressed as percentages by weight of total composition. Such animal feed concentrate compositions are particularly preferred in that, without addition of a further amount of either antibiotic and/or potentiating agent, they facilitate the administration to the animal of the appropriate amounts of antibiotic and potentiating agent, regardless of whether they are administered directly to animals or mixed with other adjuvants to obtain an animal feed which is then fed to animals.

Thus, in another embodiment there is employed an animal feed, that is, a composition which serves as the principal food ration. With such a composition, satisfactory results are obtained with a ration containing only minor amounts of tetracycline antibiotic and potentiating agent. The exact amounts of antibiotic and potentiating agent are dependent upon the food and water consumption and feeding and watering habits of the animal concerned, and upon the prophylactic and/or therapeutic effect sought from administration of the tetracycline antibiotics. In the instance of the tetracycline antibiotic, there is employed an effective amount, that is, an amount which is sufficient to provide at least a prophylactic effect. Generally, therefore, the antibiotic is employed at rates of from about 0.001 percent of the animal feed (about 9 grams per ton). Higher concentrations of the antibiotics, such as concentrations of up to 900 grams per ton, or higher, are employed in many applications, although, as previously noted, the Federal Food and Drug Administration has set a maximum level for administration under each of many circumstances. Generally, this level is 200 grams per ton or less. The preferred effective amount of the tetracycline antibiotic is an amount of from 50 to 200 grams per ton.

The amount of the present potentiating agent which is effecive to potentiate the tetracycline antibiotic also varies. Generally, good results are obtained when the agent is present in the animal feed in a concentration of from about 0.010 percent (about 90 grams per ton) to about 0.50 percent (about 4500 grams per ton). A preferred amount of the potentiating agent is that representing a concentration of from 0.10 to 0.20 percent of the animal feed, or, yet more preferred, about 0.15 percent of the animal feed. As noted, however, the appropriate amount varies, depending upon, among other factors, the animal concerned. With the fowl, the preferred practice has been found to comprise the administration of an animal feed containing the antibiotic in a concentration of 200 grams per ton and the potentiating agent in a concentration of about 0.15 percent.

When it is convenient to administer the tetracycline antibiotic and the present potentiating agent in water, concentrations in water should be adjusted according to the known water demand of the animal to be treated. Animals with low water demand are treated with higher water concentrations, and animals with higher water demand are effectively treated with the antibiotic and potentiating agent in lower concentrations. In this situation, the total amount ingested should be adjusted so as to approximate the same intake per unit body weight as would be achieved in other methods of administration.

Liquid feed compositions containing the desired amount of antibiotic and/or potentiating agent can be prepared by dispersing the substances in liquids, such as edible oils, or water, with or without the aid of a suitable surface active dispersing agent such as an ionic or nonionic surface active agent. Suitable surface active dispersing agents include the glycerol and sorbitan mono-esters of fatty acids and the polyoxyalkylene derivatives of fatty alcohols and of sorbitan esters. The aqueous compositions can contain one or more water-immiscible organic liquids as an aid in dispersing the active agents.

In the preparation of solid feed compositions, the antibiotic and/or potentiating agent can be mechanically ground with an edible solid such as cereal meal, including ground yellow corn and ground oats; finely ground meat and bone scraps, or a solid surface active dispersing agent such as finely divided bentonite or fuller's earth. These compositions can be employed directly to supply a part or all of the ration. Also, the antibiotic and/or potentiating agent can be dissolved in an organic solvent such as alcohol or acetone and the resulting mixture dispersed in an animal feed which, if desired, is then dried to remove the solvent. The antibiotic and potentiating agent can also be dispersed in an edible oil such as coconut, olive, linseed, soybean, cottonseed or peanut oil, or animal fats and tallows, and the resulting mixtures dispersed in the feed. These edible oil compositions can contain one of the aforementioned emulsifying materials as a dispersing agent.

It has been noted that the present potentiating agent synergizes the use of ethylenediaminetetraacetic acid, and of its sodium salts, at rates sufficiently low that the growth depression previously noted for these substances is eliminated or markedly reduced. Accordingly, the present invention comprehends the joint use of the potentiating agent as herein defined and of ethylenediaminetetraacetic acid, or its sodium salt.

A preferred sub-group of the products to be employed in accordance with the present invention are those of the formula:

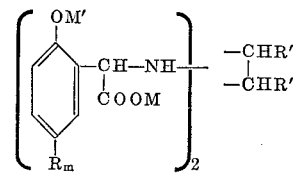

wherein $m$ represents 0 or 1. A yet more preferred group of compounds is N,N'-ethylenebis(2-(o-hydroxyphenyl)-glycine) and its alkali metal and ammonium salts:

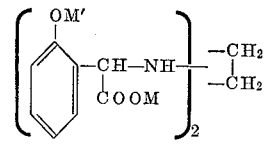

This latter preferred group is distingished in that it exhibits to an enhanced degree the potentiating activity exhibited by all of the products to be employed in accordance with the present invention.

The following examples illustrate the present invention and will enable those skilled in the art to practice the same.

EXAMPLE 1

In numerous evaluations, in poultry, of potentiating agent to be employed in accordance with the present invention, modified poultry feed, hereinafter designated the "modified basic ration" was employed. This modified basic ration was obtained by the modification which consisted of deleting dicalcium phosphate and ground limestone from the following standard formula for poultry feed:

| | Percent of ration |
|---|---|
| Yellow corn meal | 58.65 |
| Corn gluten meal | 2.50 |
| Soybean meal | 24.75 |
| Fish meal | 6.25 |
| Stabilized animal fat | 3.75 |
| Alfalfa meal | 1.25 |
| Limestone, ground | 0.75 |
| Dicalcium phosphate | 1.25 |
| Salt (NaCl) | 0.30 |
| Vitamin supplement | 0.50 |
| Mineral supplement | 0.05 |
| | 100.00 |

Hence, the modified basic ration employed in the evaluations was of the above approximate composition but for the absence of dicalcium phosphate and ground limestone. Upon analysis, it was found that the modified basic ration contained approximately 0.39 percent calcium and 0.50 percent phosphorous. No antibiotic of any type was present in the modified basic ration.

In a first operation, two groups of young chicks, or an age of about three weeks, were employed. Each group comprised approximately equal numbers of each sex. All of the chicks were in good health. In this operation, one group, the control group, was fed a diet consisting of the modified basic ration to which there had been added oxytetracycline hydrochloride, only, in an amount to provide a concentration of 200 grams per ton of resulting feed. The second group of chicks, the treated group, was fed a diet which consisted of the modified basic ration to which there had been added oxytetracycline hydrochloride as well as N,N'-ethylenebis(2-(o-hydroxyphenyl)glycine). In this latter diet, the "treated diet," the additives were present in a concentration of 200 grams of oxytetracycline hydrochloride per ton of ultimate treated diet and 0.15 percent of the N,N'-ethylenebis(2-(o-hydroxyphenyl)glycine), the percentage expressed as weight of potentiating agent by weight of the ultimate treated diet.

Feeding of the two groups was begun simultaneously, both groups being maintained during the course of the evaluations under the same conditions, with unrestricted access to water, their conditions differing only in the composition of the diet. Feeding was continued for a period of about five days. At the end of this period, all of the chicks were bled, and the blood from each chick analyzed in conventional techniques to determine the level of oxytetracycline antibiotic present in the blood. In this operation, it was found that the average blood level of oxytetracycline antibiotic for the treated group of chicks was 0.53 microgram per milliliter, whereas in the control group, the oxytetracycline antibiotic level in the blood was found to be so low that it could not be detected by the conventional analytical techniques.

EXAMPLE 2

Results essentially the same as those reported in Example 1 are obtained when the tetrasodium salt of N,N'-ethylenebis(2-(o-hydroxyphenyl)glycine) is evaluated in the procedures of Example 1, employing an amount of the tetrasodium salt (0.17 percent by weight of the ultimate treated diet) equivalent on a molecular basis to the 0.15 percent of the compound evaluated in Example 1.

EXAMPLE 3

Another operation was carried out in accordance with the procedures of Example 1. In this operation, numerous treated groups, and a control group, were employed. As in Example 1, the antibiotic was present in all diets in the concentration of 200 grams per ton of total feed. However, the diet of each group of chicks contained an amount, from zero to 0.80 percent of N,N'-ethylenebis(2-(o-hydroxyphenyl)glycine) by weight of total diet. The concentration of the potentiating agent in the diet, expressed as percent by weight of total diet, for a group of chicks at each concentration level, and the blood levels ascertained, are as set forth in the following table.

TABLE I

| Concentration of N,N'-ethylenebis(2-(o-hydroxyphenyl)glycine) in diet: | Mcg./ml.[1] |
|---|---|
| 0 (control) | 0.29 |
| 0.01 | 0.39 |
| 0.03 | 0.47 |
| 0.05 | 0.53 |
| 0.10 | 0.66 |
| 0.30 | 0.69 |
| 0.40 | 0.78 |
| 0.80 | 0.81 |

[1] Oxytetracycline antibiotic level in blood.

EXAMPLE 4

Results essentially the same as those reported in Example 3 are obtained when evaluating the dihydrochloride of N,N'-ethylenebis(2-(o-hydroxyphenyl)glycine) in the procedures of Example 3, employing amounts of the dihydrochloride equivalent on a molecular basis to the amounts of the compound employed in Example 3.

EXAMPLE 5

Another operation was carried out in accordance with the procedures of Example 3. This operation was more extensive, however, in that it included an evaluation of the potentiation of tetracycline hydrochloride an chlortetracycline hydrochloride as well as oxytetracycline hydrochloride. The results are set forth in the following table:

TABLE II

| Antibiotic | Concentration of N,N'-ethylenebis(2-(o-hydroxyphenyl)-glycine) in diet | Antibiotic level in blood in micrograms per milliliter |
|---|---|---|
| Oxytetracycline hydrochloride | [1] 0.00 | 0.38 |
| | 0.05 | 0.54 |
| | 0.10 | 0.65 |
| | 0.15 | 0.74 |
| Chlortetracycline hydrochloride | [1] 0.00 | 0.27 |
| | 0.05 | 0.45 |
| | 0.10 | 0.80 |
| | 0.15 | 0.82 |
| Tetracycline hydrochloride | [1] 0.00 | 0.13 |
| | 0.05 | 0.38 |
| | 0.10 | 0.49 |
| | 0.15 | 0.84 |

[1] Control.

EXAMPLE 6

Another operation was carried out in accordance with the procedures of Example 1 except that tetracycline hydrochloride was employed as the antibiotic and that the potentiating effect was evaluated at several levels of antibiotic in the diet. The results of the evaluation are set forth in the following table:

TABLE III

| Concentration of tetracycline hydrochloride in diet in grams per ton | Concentration of N,N'-ethylenebis-(2-(o-hydroxyphenyl)glycine) in diet | Tetracycline antibiotic level in blood in micrograms per milliliter |
|---|---|---|
| 200 | [1] 0.00 | 0.11 |
|  | 0.15 | 0.28 |
| 400 | [1] 0.00 | 0.28 |
|  | 0.15 | 0.92 |
| 800 | [1] 0.00 | 0.87 |
|  | 0.15 | 1.50 |

[1] Control.

EXAMPLES 7–9

N,N'-ethylenebis(2 - (o - hydroxyphenyl)glycine) was evaluated as a potentiating agent in diets with various levels of calcium content. The evaluation comprised three separate operations. In each operation, groups of young chicks, of an age of about four weeks, were employed. Each group comprised approximately equal numbers of each sex. All of the chicks were in good health.

In one operation (Example 7), there was employed a diet prepared by deleting from the standard formula set forth in Example 1 the fish meal, ground limestone, and dicalcium phosphate, and adding tetracycline hydrochloride, only. The tetracycline hydrochloride was added in an amount to provide 400 grams per ton of ultimate diet. Upon analysis, the resulting feed was found to contain 0.08 percent residual calcium and 0.31 percent residual phosphorus. In this operation, the resulting feed was fed without further modification to the control group. The treated group was fed the above diet further modified by the addition of N,N'-ethylenebis(2-(o-hydroxyphenyl)glycine) in a concentration of 0.15 percent.

In the second operation (Example 8), the control group was fed the modified basic diet of Example 1 to which there had been added tetracycline hydrochloride, only, at the rate of 400 grams per ton. The corresponding treated group was fed the resulting diet further modified by the addition of N,N'-ethylenebis(2-(o-hydroxyphenyl)glycine) in a concentration of 0.15 percent.

In the third operation (Example 9), the control group was fed the modified basic diet of Example 1 to which there had been added tetracycline hydrochloride, only, at the rate of 400 grams per ton and calcium carbonate and sodium phosphate in amounts to provide a total concentration of 1.00 percent calcium and 0.73 percent phosphorus. The corresponding treated group was fed the resulting diet further modified by the addition of N,N'-ethylenebis(2-(o-hydroxyphenyl)glycine) in a concentration of 0.15 percent.

Feeding of all groups was simultaneously begun, all of the chicks being maintained during the course of the evaluation under the same conditions, but for the composition of the diets. Feeding was continued for a period of about five days. At the end of this period, all of the chicks were bled, and the blood from each chick analyzed in conventional techniques to determine the level of antibiotic present in the blood. The results of the analyses were averaged for each group and the resulting averages are set forth in the following table:

TABLE IV

|  | Tetracycline antibiotic level in blood in micrograms per milliliter |
|---|---|
| Example 7 (0.08 percent calcium; 0.31 percent phosphorus): |  |
| Control group | 0.30 |
| Treated group | 0.87 |
| Example 8 (0.39 percent calcium; 0.50 percent phosphorus): |  |
| Control group | 0.33 |
| Treated group | 0.60 |
| Example 9 (1.00 percent calcium; 0.73 percent phosphorus): |  |
| Control group | [1] |
| Treated group | 0.29 |

[1] None detectable by analytical methods.

EXAMPLE 10

The potentiating agent of the present invention was evaluated in the treatment of a herd of swine. All of the swine were of an age of about ten weeks and were in good health. The herd was divided into two groups, and each group was thereafter fed a separate diet. In all other respects, all groups were maintained under essentially identical conditions.

For this evaluation, there was prepared a Basal Diet having the following composition:

| Ingredient: | Pounds of ingredient [1] |
|---|---|
| Ground yellow corn | 79.25 |
| Soybean meal | 18.00 |
| Dicalcium phosphate | 1.00 |
| Ground limestone | 1.00 |
| Vitamin premix | 0.50 |
| Salt | 0.25 |
|  | 100.00 |

[1] Per 100 pounds of total diet.

The first group of swine was fed a diet comprising the foregoing described Basal Diet to which there had been added 200 grams of tetracycline hydrochloride per ton. The second group was fed a diet comprising the foregoing described Basal Diet to which there had been added 200 grams of tetracycline hydrochloride per ton and N,N'-ethylenebis(2-(o-hydroxyphenyl)glycine) in an amount to provide a concentration of 0.15 percent of total composition.

Feeding of the respective diets was continued for a period of five days. At the end of this period, each of the swine was bled to obtain a blood sample, and the blood sample analyzed in conventional procedures to determine the concentration therein of the tetracycline antibiotic. The concentration figures thus obtained were averaged for each group. The results are set forth in the following table:

TABLE V

| Group on diet: | Mcg./ml.[1] |
|---|---|
| Comprising Basal Diet plus 200 grams of tetracycline hydrochloride per ton | 0.112 |
| Comprising Basal Diet plus 200 grams of tetracycline hydrochloride per ton and 0.15 percent of N,N'-ethylenebis(2-(o-hydroxyphenyl)glycine) | 0.365 |

[1] Tetracycline antibiotic level in blood.

EXAMPLE 11

In order to ascertain optimal levels for potentiation, ethylenediaminetetraacetic acid was evaluated, at levels of 0.1, 0.2, 0.4, and 1.00 percent, for its effectiveness in potentiating tetracycline blood levels. The evaluations were carried out in accordance with the procedures set forth in Example 1. The results are set forth in the following table:

TABLE VI

Percent of ethylenediaminetetraacetic acid in the diet: Mcg./ml.[1]

| | |
|---|---|
| 0.10 | 0.26 |
| 0.20 | 0.35 |
| 0.40 | 0.34 |
| 1.00 | 0.50 |

[1] Tetracycline antibiotic level in blood.

The same evaluations were carried out with chlortetracycline. The results were as follows:

TABLE VII

Percent of ethylenediaminetetraacetic acid in the diet: Mcg./ml.[1]

| | |
|---|---|
| 0.10 | 0.44 |
| 0.20 | 0.63 |
| 0.40 | 0.67 |
| 1.00 | 0.68 |

[1] Chlortetracycline antibiotic level in blood.

Thus it was judged that minimal optimal rates of ethylenediaminetetraacetic acid were in the range of 0.4–0.6 percent, higher rates affording only approximately the same degree of potentiation and being undesirable from the standpoint of the known growth-depressing properties of the substance.

EXAMPLES 12–14

N,N'-ethylenebis(2 - (o - hydroxyphenyl)glycine) and ethylenediaminetetraacetic acid were compared for their efficacy in potentiating the uptake of tetracycline. The comparison was carried out with groups of young chicks, of an age of about three weeks. Each group comprised approximately equal numbers of each sex, and all of the chicks were in good health. The comparison comprised three separate evaluations (Examples 12, 13, and 14, respectively). In each evaluation, the control group was fed the modified basic ration, as described in Example 1, to which there had been added a given amount of tetracycline hydrochloride, only. In the first evaluation, this amount was 200 grams per ton, in the second evaluation, 400 grams per ton, and in the third evaluation, 800 grams per ton. Each of the remaining groups of a given evaluation was fed a diet which comprised the same amount of the tetracycline hydrochloride as well as an amount of either N,N'-ethylenebis(2-(o-hydroxyphenyl)-glycine) or ethylenediaminetetraacetic acid. In the instance of N,N'-ethylenebis(2-(o-hydroxyphenyl)glycine), the rates were 0.10 percent and 0.15 percent; in the instance of ethylenediaminetetraacetic acid, the representative rate chosen, based upon the work reported in the Example 11, was 0.40 percent in the instance of the first evaluation and 0.60 percent in the instance of the second and third evaluations.

Feeding of the groups was begun simultaneously, all groups being maintained during the course of the comparison under the same conditions, but for the composition of the diets. Feeding was continued for a period of about five days. At the end of this period, all of the chicks were bled, and the blood from each chick analyzed in conventional techniques to determine the level of tetracycline antibiotic present in the blood. The results of the analyses were averaged for each group and the resulting averages are set forth in the following table:

TABLE VIII

Identity of group—

Example 12—(Evaluation 1): Mcg./ml.[1]

| | |
|---|---|
| Control Group, 200 grams of tetracycline hydrochloride, only, per ton | 0.13 |
| Group on Diet comprising 200 grams of tetracycline hydrochloride per ton and 0.40 percent of ethylene-diaminetetraacetic acid | 0.32 |
| Group on Diet comprising 200 grams of tetracycline hydrochloride per ton and 0.15 percent of N,N' - ethylenebis(2 - (o - hydroxyphenyl)glycine | 0.84 |

Example 13—(Evaluation 2):

| | |
|---|---|
| Control Group, 400 grams of tetracycline hydrochloride, only, per ton | 0.28 |
| Group on Diet comprising 400 grams of tetracycline hydrochloride per ton and 0.60 percent of ethylene-diaminetetraacetic acid | 0.63 |
| Group on Diet comprising 400 grams of tetracycline hydrochloride per ton and 0.10 percent of N,N' - ethylenebis(2 - (o - hydroxyphenyl)glycine) | 0.76 |
| Group on Diet comprising 400 grams of tetracycline hydrochloride per ton and 0.15 percent of N,N' - ethylenebis(2 - (o - hydroxyphenyl)glycine) | 0.92 |

Example 14—(Evaluation 3):

| | |
|---|---|
| Control Group, Diet comprising 800 grams of tetracycline hydrochloride, only, per ton | 0.87 |
| Group on Diet comprising 800 grams of tetracycline hydrochloride per ton and 0.60 percent of ethylenediaminetetraacetic acid | 1.29 |
| Group on Diet comprising 800 grams of tetracycline hydrochloride per ton and 0.10 percent of N,N' - ethylenebis(2 - (o - hydroxyphenyl)glycine) | 1.38 |
| Group on Diet comprising 800 grams of tetracycline hydrochloride per ton and 0.15 percent of N,N' - ethylenebis(2 - (o-hydroxyphenyl)glycine) | 1.50 |

[1] Tetracycline antibiotic level in blood.

Hence, the foregoing table shows that the use of N,N'-ethylenebis(2-(o-hydroxyphenyl)glycine) results in even greater potentiation than that obtained with ethylenediaminetetraacetic acid in representative rates which are four to six times the rates of N,N'-ethylenebis(2-(o-hydroxyphenyl)glycine).

Inasmuch as the molecular weight of ethylene-diaminetetraacetic acid is 292.5, the dosages employed in these evaluations (0.40 percent and 0.60 percent) represented 12.4 gram moles and 18.6 gram moles, respectively, of the compound per ton—and similarly, inasmuch as the molecular weight of N,N' - ethylenebis(2 - (o - hydroxyphenyl)glycine) is 360.4, the dosages employed in these evaluations (0.10 and 0.15 percent) represented 2.5 and 3.8, respectively, gram moles of the compound per ton. Hence, the foregoing table shows that, considered on a molecular basis, one molecule of the N,N'-ethylenebis-(2-(o-hydroxyphenyl)glycine) to be employed in accordance with the present invention is significantly more effective than five to seven and one-half molecules of ethylenediaminetetraacetic acid.

Each molecule of N,N' - ethylenebis(2 - (o - hydroxyphenyl)glycine) contains two carboxyl moieties; each molecule of ethylenediaminetetraacetic acid contains four carboxyl moieties. Thus, if the efficacy of the compounds relative to one another in potentiation of the tetracycline antibiotic be calculated upon the basis of carboxyl moieties, letting the relative potentiation efficacy per carboxyl in the ethylenediaminetetraacetic acid be unity, the potentiation efficacy per carboxyl in the potentiating agent of the present invention is in the range of 10 to 15.

EXAMPLES 15-16

Ethylenediaminetetraacetic acid and N,N'-ethylenebis(2-(o-hydroxyphenyl)glycine) were further compared to determine their respective effectiveness in the potentiation of antibiotic uptake. Each compound was evaluated at several representative rates. This comparison was carried out in accordance with the procedures of the foregoing examples, each of tetracycline hydrochloride, oxytetracycline hydrochloride, and chlorotetracycline hydrochloride being separately evaluated, each at a rate of 200 grams per ton. The results are set forth in the following table.

TABLE IX

| Candidate potentiation compound and concentration in diet in gram moles per ton | Antibiotic blood level in micrograms per milliliter | | |
|---|---|---|---|
| | Oxy-tetracycline | Chlor-tetracycline | Tetracycline |
| Example 15; Ethylenediaminetetraacetic: | | | |
| 3.1 | 0.51 | 0.42 | 0.25 |
| 6.2 | 0.54 | 0.59 | 0.32 |
| 12.4 | 0.60 | 0.59 | 0.32 |
| 31.0 | 0.75 | 0.53 | 0.42 |
| Example 16; N,N'-ethylenebis(2-(o-hydroxyphenyl)glycine): | | | |
| 1.25 | 0.54 | 0.45 | 0.38 |
| 2.5 | 0.65 | 0.80 | 0.49 |
| 3.75 | 0.74 | 0.82 | 0.84 |
| 5.0 | 0.72 | 1.14 | 0.53 |

This table shows that the N,N'-ethylenebis(2-(o-hydroxyphenyl)glycine) is significantly more active than ethylenediaminetetraacetic acid, considered on a molecular basis. Hence, for example, the administration of N,N'-ethylenebis(2-(o-hydroxyphenyl)glycine) at a rate of 2.5 gram moles per ton resulted in antibiotic blood levels which could be achieved only by the administration of 31.0 gram moles of ethylenediaminetetraacetic acid—a concentration of the latter which is 12 times greater than the former.

EXAMPLE 17

The practice of the present invention was evaluated for its beneficial role in the control of chronic respiratory disease. In this evaluation, a flock of infected chicks of an age of about three weeks was employed. In view of the highly infectious nature of chronic respiratory disease, as well as the prevalence among the chickens in the flock of one of the more readily discernible symptoms of the disease, a persistant "snick," it was judged that all members of the flock were infected. The flock was subdivided into nine groups. Three of these groups were treated with N,N'-ethylenebis(2-(o-hydroxyphenyl)glycine), and five others, with ethylenediaminetetraacetic acid. The ninth served as an "infected" control group. Another group of chickens, judged by sereological test to be entirely free from chronic respiratory disease, was employed as an "uninfected" control group. All chicks were weighed at the beginning of the test.

The evaluation was begun and continued for seven days. Inasmuch as the uninfected control group was free of disease, it was fed a conventional poultry feed, of the standard formula set forth in Example 1, during the entire test period. The infected control group was fed a diet comprising the modified basic diet, described in Example 1, to which there had been added 200 grams of tetracycline hydrochloride, only, per ton. The resulting diet was fed for the first 4 days of the test. Each of the remaining, treated, groups was fed a diet comprising the modified basic diet to which there had been added 200 grams of tetracycline per ton and an amount of either N,N'-ethylenebis(2-(o-hydroxyphenyl)glycine) or ethylenediaminetetraacetic acid. These diets were similarly fed for only the first 4 days of the test. Thereafter, both the infected control group and the treated groups were fed a diet which consisted of the modified basic diet to which there had been added sufficient calcium and phosphorus to obtain a concentration of 1.00 percent calcium and 0.73 percent phosphorus by weight of ultimate composition.

During the course of the 7-day test period, mortality occurred in the infected control group and in certain of the treated groups. Dead birds were weighed and autopsied to determine the presence, and if present, severity, of the disease. In the uninfected control group, no symptoms of the disease were found at any time. At the end of the test period, all live birds, including the birds of the uninfected control group, were killed, weighed, and autopsied. Percent mortality was calculated for each group. Also, the percent weight gain was calculated, including birds which died prior to the end of the test period. The results of these evaluations are set forth in the following table.

TABLE X

| Identity of group | Percent weight gain | Percent incidence of chronic respiratory disease | Percent of mortality |
|---|---|---|---|
| Uninfected control group | 28.8 | 0 | 0 |
| Infected control group | 19.73 | 60 | 10 |
| Infected groups on diets comprising N,N'-ethylenebis(2-(o-hydroxyphenyl)-glycine): | | | |
| 2.5 gram moles per ton | 31.8 | 30 | 0 |
| 3.8 gram moles per ton | 32.8 | 30 | 0 |
| 5.0 gram moles per ton | 26.5 | 10 | 10 |
| Infected groups on diets comprising ethylenediaminetetraacetic acid: | | | |
| 3.1 gram moles per ton | 17.9 | 90 | 20 |
| 6.2 gram moles per ton | 0.9 | 70 | 50 |
| 12.4 gram moles per ton | 11.9 | 70 | 40 |
| 23.3 gram moles per ton | 13.5 | 70 | 40 |
| 31.0 gram moles per ton | 19.0 | 80 | 10 |

These data show that the use of the N,N'-ethylenebis(2-(o-hydroxyphenyl)glycine) significantly potentiated tetracycline therapy, as indicated by the absence of mortality or by reduced mortality, and by a lower incidence of disease on autopsy. In addition, the potentiation was obtained without growth depression. By contrast, the use of ethylenediaminetetraacetic acid, even at rates as much as approximately ten times (on a molecular basis) the rate at which the potentiating agent of the present invention was used, was ineffective in the treatment of chronic respiratory disease, as indicated by high mortality and high incidence of the disease upon autopsy: in addition, the use of ethylenediaminetetraacetic acid was accompanied by significant depression of growth.

EXAMPLE 18

N,N' - ethylenebis(2 - (o-hydroxyphenyl)glycine) was further evaluated for its beneficial role in the control of chronic respiratory disease. The evaluation was carried out in accordance with the procedures of Example 17, the tetracycline antibiotic employed being chlortetracycline hydrochloride. The N,N'-ethylenebis(2-(o-hydroxyphenyl)glycine) was employed at a rate of 0.10 percent in the diet (2.5 gram moles per ton) and the ethylenediaminetetraacetic acid, at rates of 0.10 percent (3.1 gram moles per ton), 0.20 percent (6.2 gram moles per ton), and 0.75 percent (23.25 gram moles per ton). The results are set forth in the following table:

TABLE XI

| Identity of group | Percent weight gain | Percent incidence of chronic respiratory disease | Percent of mortality |
|---|---|---|---|
| Uninfected control group | 38.40 | 0 | 0 |
| Infected control group | 6.07 | 100 | 20 |
| Infected group on diet comprising 2.5 gram moles of N,N'-ethylenebis(2-(o-hydroxyphenyl)-glycine) per ton | 30.08 | 10 | 0 |
| Infected groups fed on diets comprising ethylenediaminetetraacetic acid: | | | |
| 3.1 gram moles per ton | 24.61 | 100 | 20 |
| 6.2 gram moles per ton | 18.89 | 100 | 0 |
| 23.3 gram moles per ton | 14.11 | 80 | 20 |

These data show that the use of the N,N'-ethylenebis-(2-(o-hydroxyphenyl)glycine) significantly enhanced the beneficial effect of chlortetracycline medication, as indicated by the absence of mortality and by a lower incidence of disease symptoms. By contrast, the use of ethylenediaminetetraacetic acid, even at twelve-fold the molar rate at which N,N'-ethylenebis(2-(o-hydroxyphenyl)-glycine) was used, was ineffective in the treatment of chronic respiratory disease as indicated by high mortality and high incidence of the disease upon autopsy.

In the interpretation of Table XI, it is noted that, as diet concentration of ethylenediaminetetraacetic acid was increased, weight gain decreased. The growth-inhibiting action of dietary ethylenediaminetetraacetic acid has been described in the prior art.

In the foregoing specification, the term "ton" is used to mean 2000 pounds. Also in the foregoing specification, the blood level of the tetracycline antibiotic is uniformly the antibiotic level in the blood serum. This is in accord with the standardized procedures employed in evaluating the efficacy of the tetracycline antibiotics; in these procedures the solids are removed from the whole blood by heating and subsequent centrifuging, and the resulting serum analyzed for its content of the tetracycline antibiotic.

In the appended claims, the term "calcium-diminished animal feed" is employed to designate an animal feed containing not more than about 1 percent of calcium.

I claim:

1. Method which comprises administering orally and essentially simultaneously to a warm-blooded animal both of (A) a tetracycline antibiotic in amount of from 0.05 to 8 milligrams of antibiotic per kilogram of animal body weight and (B) a potentiating agent in a non-toxic amount of from 12 to 30 milligrams of potentiating agent per kilogram of animal body weight, said potentiating agent being a compound of the formula:

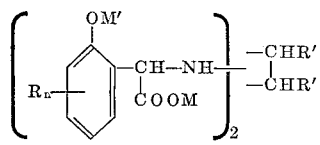

wherein M represents hydrogen, sodium, potassium or ammonium, and, M being hydrogen, M' represents hydrogen, or, M being sodium, potassium or ammonium, M' represents hydrogen or the same moiety represented by M; R in each of its $n$ occurrences independently represents halo, hydroxy, loweralkyl, or loweralkoxy; $n$ represents an integer of from 0 to 2, both inclusive; and each R', taken separately, independently represents hydrogen or methyl, or both R' moieties taken together represent a 1,4-butylene radical.

2. Method which comprises administering orally to a warm blooded animal a composition comprising both of a tetracycline antibiotic in amount of from 0.05 to 8 milligrams of antibiotic per kilogram of animal body weight and a potentiating agent in a non-toxic amount of from 12 to 30 milligrams of potentiating agent per kilogram of animal body weight, said potentiating agent being a compound of the formula:

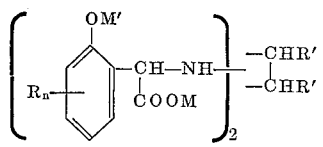

wherein M represents hydrogen, sodium, potassium or ammonium, and, M being hydrogen, M' represents hydrogen, or, M being sodium, potassium or ammonium, M' represents hydrogen or the same moiety represented by M; R in each of its $n$ occurrences independently represents halo, hydroxy, loweralkyl, or loweralkoxy; $n$ represents an integer of from 0 to 2, both inclusive; and each R', taken separately, independently represents hydrogen or methyl, or both R' moieties taken together represent a 1,4-butylene radical.

3. The method of claim 2 wherein the composition is an animal feed.

4. The method of claim 3 wherein the potentiating agent is a compound of the formula:

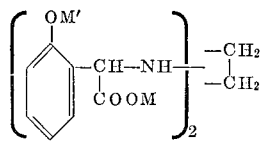

wherein M represents hydrogen, sodium, potassium, or ammonium; and, M being hydrogen, M' represents hydrogen, or, M being sodium, potassium or ammonium, M' represents hydrogen or the same moiety represented by M.

5. The method of claim 3 wherein the animal is a fowl.

6. The method of claim 5 wherein the animal feed is a calcium-diminished animal feed.

7. The method of claim 6 wherein the potentiating agent is a compound of the formula:

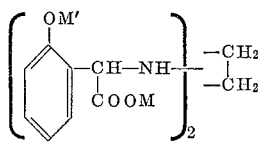

wherein M represents hydrogen, sodium, potassium or ammonium; and, M being hydrogen, M' represents hydrogen, or, M being sodium, potassium or ammonium, M' represents hydrogen or the same moiety represented by M.

8. The method of claim 3 wherein the tetracycline antibiotic is tetracycline hydrochloride.

9. The method of claim 8 wherein the potentiating agent is a compound of the formula:

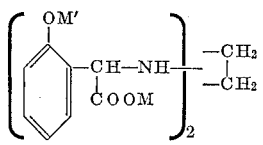

wherein M represents hydrogen, sodium, potassium or ammonium; and, M being hydrogen, M' represents hydrogen, or, M being sodium, potassium or ammonium, M' represents hydrogen or the same moiety represented by M.

10. The method of claim 8 wherein the animal is a fowl.

11. The method of claim 10 wherein the animal feed is a calcium-diminished animal feed.

12. The method of claim 11 wherein the potentiating agent is a compound of the formula:

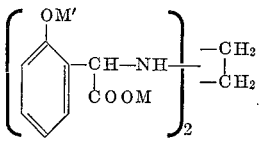

wherein M represents hydrogen, sodium, potassium or amonium; and, M being hydrogen, M' represents hydrogen, or, M being sodium, potassium or ammonium, M' represents hydrogen or the same moiety represented by M.

13. The method of claim 12 wherein the tetracycline hydrochloride is present in the calcium-diminished animal feed in a concentration of at least 50 grams of tetracycline hydrochloride per ton of ultimate calcium-diminished animal feed.

14. The method of claim 3 wherein the tetracycline antibiotic is oxytetracycline hydrochloride.

15. The method of claim 3 wherein the tetracycline antibiotic is chlortetracycline hydrochloride.

16. An animal feed concentrate comprising from 0.5 to 99.5 percent of a tetracycline antibiotic and from 99.5 to 0.5 percent of a potentiating agent, both percentages being expressed as percentages by weight of total composition, and any other ingredients being normal animal feed concentrate ingredients, said potentiating agent being a compound of the formula:

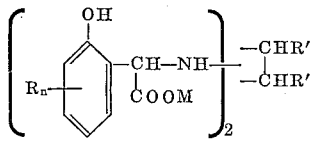

wherein M represents hydrogen, sodium, potassium or ammonium, and, M being hydrogen, M' represents hydrogen, or, M being sodium, potassium or ammonium, M' represents hydrogen or the same moiety represented by M; R in each of its $n$ occurrences independently represents halo, hydroxy, loweralkyl, or loweralkoxy; $n$ represents an integer of from 0 to 2, both inclusive; and each R', taken separately, independently represents hydrogen or methyl, or both R' moieties taken together represent a 1,4-butylene radical.

17. The composition of claim 16 comprising from 2 to 20 percent of the tetracycline antibiotic and from 98 to 80 percent of the potentiating agent.

18. Animal feed composition comprising (A) from 0.001 to 0.1 weight percent of a tetracycline antibiotic and (B) a non-toxic amount of from 0.01 to 0.5 weight percent of a potentiating agent and (C) animal feed, said potentiating agent being a compound of the formula:

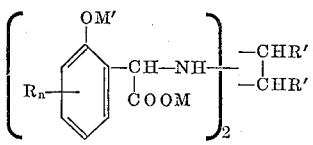

wherein M represents hydrogen, sodium, potassium or ammonium; and, M being hydrogen, M' represents hydrogen, or, M being sodium, potassium or ammonium, M' represents hydrogen or the same moiety represented by M; R in each of its $n$ occurrences independently represents halo, hydroxy, loweralkyl, or loweralkoxy; $n$ represents an integer of from 0 to 2, both inclusive; and each R', taken separately, independently represents hydrogen or methyl, or both R' moieties taken together represent a 1,4-butylene radical.

19. The animal feed of claim 18 wherein the potentiating agent is a compound of the formula:

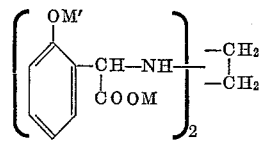

wherein M represents hydrogen, sodium, potassium or ammonium; and, M being hydrogen, M' represents hydrogen, or, M being sodium, potassium or ammonium, M' represents hydrogen or the same moiety represented by M.

20. The animal feed of claim 18 which is a calcium-diminished animal feed.

21. The animal feed of claim 20 wherein the potentiating agent is a compound of the formula:

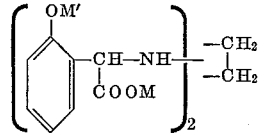

wherein M represents hydrogen, sodium, potassium or ammonium; and, M being hydrogen, M' represents hydrogen, or, M being sodium, potassium or ammonium, M' represents hydrogen or the same moiety represented by M.

22. The animal feed of claim 18 in which the tetracycline antibiotic is present in a concentration of at least 50 grams of said antibiotic per ton of ultimate animal feed.

23. The composition of claim 18 wherein the tetracycline antibiotic is tetracycline hydrochloride.

24. The composition of claim 23 wherein the potentiating agent is a compound of the formula:

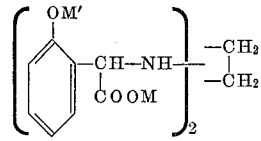

wherein M represents hydrogen, sodium, potassium or ammonium; and, M being hydrogen, M' represents hydrogen, or, M being sodium, potassium or ammonium, M' represents hydrogen or the same moiety represented by M.

25. The composition of claim 23 which is a calcium-diminished animal feed.

26. The composition of claim 25 wherein the potentiating agent is a compound of the formula:

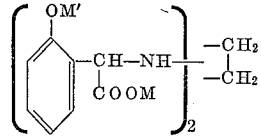

wherein M represents hydrogen, alkali metal, or ammonium; and, M being hydrogen, M' represents hydrogen, or, M being alkali metal or ammonium, M' represents hydrogen or the same moiety represened by M.

27. The composition of claim 18 wherein the tetracycline antibiotic is oxytetracycline hydrochloride.

28. The composition of claim 18 wherein the tetracycline antibiotic is chlorotetracycline hydrochloride.

29. A composition comprising from 0.5 to 99.5 percent by weight of a tetracycline antibiotic and from 99.5 to 0.5 percent by weight of a potentiating agent of the formula

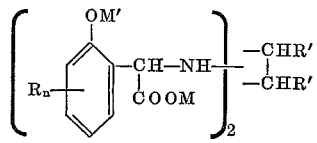

wherein M represents hydrogen, alkali metal, sodium, potassium or ammonium, and, M being hydrogen, M' represents hydrogen, or, M being sodium, potassium or ammonium, M' represents hydrogen or the same moiety represented by M; R in each of its $n$ occurrences independently represents halo, hydroxy, loweralkyl, or loweralkoxy; $n$ represents an integer of from 0 to 2, both inclusive; and each R', taken separately, independently represents hydrogen or methyl, or both R' moieties taken together represent a 1,4-butylene radical.

References Cited

UNITED STATES PATENTS

| | | | |
|---|---|---|---|
| 2,806,789 | 9/1957 | Kiser et al. | 99—2 |
| 3,282,779 | 11/1966 | Pensack et al. | 424—227 |
| 3,317,379 | 5/1967 | McCarty | 424—317 |
| 3,360,552 | 12/1967 | McCracken | 260—519 |

OTHER REFERENCES

Journal of Animal Science, Stifel et al., pp. 129–135, January 1967.

ALBERT T. MEYERS, Primary Examiner

H. M. ELLIS, Assistant Examiner

U.S. Cl. X.R.

260—519; 424—317